March 19, 1935. R. B. FUNK 1,995,245
ADJUSTABLE INSULATED JOINT
Filed April 22, 1933   2 Sheets-Sheet 1
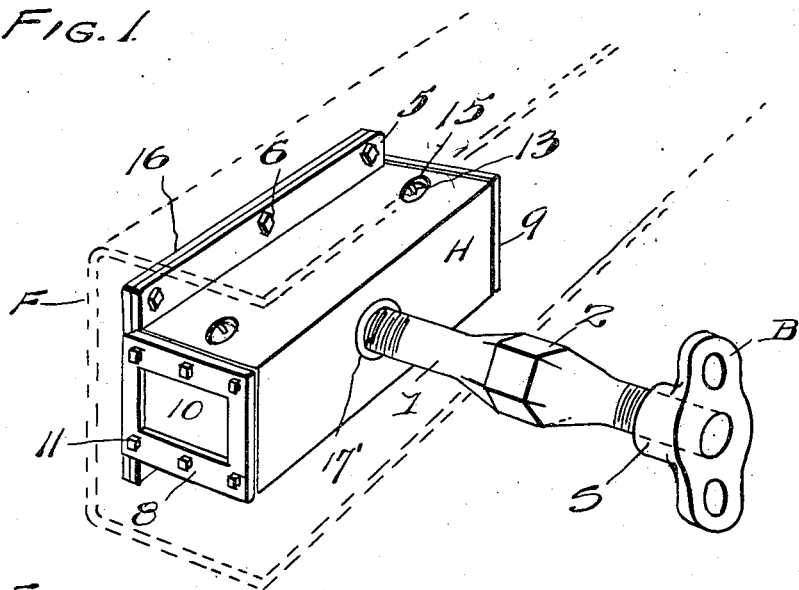
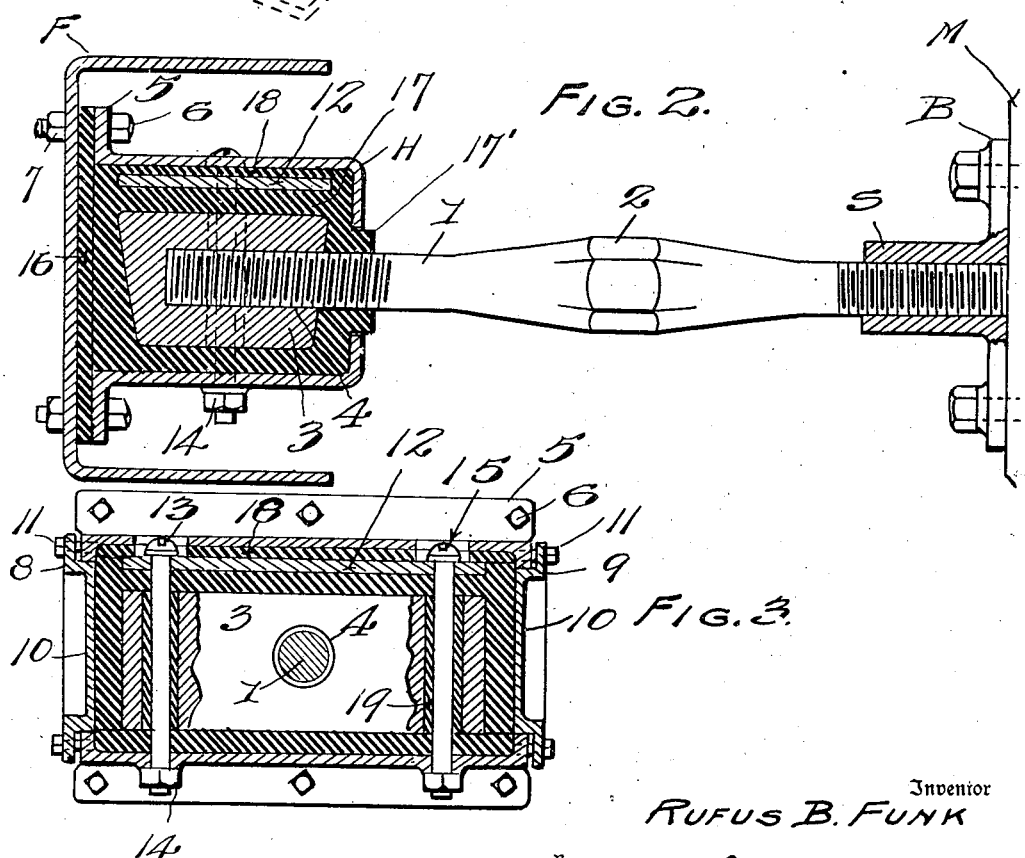
Inventor
RUFUS B. FUNK
Chas K. Davies
Attorney March 19, 1935.  R. B. FUNK  1,995,245

ADJUSTABLE INSULATED JOINT

Filed April 22, 1933  2 Sheets-Sheet 2

Inventor
RUFUS B. FUNK
By Chas. K. Davis.
Attorney

Patented Mar. 19, 1935

1,995,245

UNITED STATES PATENT OFFICE 1,995,245

ADJUSTABLE INSULATED JOINT

Rufus B. Funk, Washington, D. C.

Application April 22, 1933, Serial No. 667,435

3 Claims. (Cl. 248—14.2)

My present invention relates to improvements in adjustable insulated joints especially as employed between a supporting member and a supported member, as for example in various connections or joints between parts of automotive vehicles, and these insulated joints are utilized wherever practicable throughout the vehicle structure for the purpose of dampening, cushioning, and eliminating vibrations, as well as for eliminating sounds that arise from vibrations, when the vehicle is traveling.

As a specific exemplification of the utility of the adjustable insulated joint, I have illustrated a supporting member and a supported member, as employed in an engine mounting, and the principles of my invention are especially applicable for varying the rigidity or solidity of the joint. This adjustment in the jointed parts is attained by varying the tension or compression of the resilient insulating material in the joint. Thus the joint structure may be adjusted within a considerable range, to insure maximum rigidity or stability consistent with the desired insulation against vibrations, or to permit a desired degree of flexibility in the joint and at the same time preserve the stability of the joint.

I accomplish this adjustment in the joint in several ways, which are employed to compress the resilient insulating material utilized in the insulated joint, and the force of compression may be applied in vertical, lateral, and other lines for this purpose. In addition to the varying degrees of rigidity accomplished by the adjustment, I also compensate for wear of the insulating material, by taking up the looseness that arises from wear on the parts, and further I provide for facile replacement of parts when required.

The insulating material utilized in the joint structures is resilient and a non-conductor of sounds and vibrations, to prevent transmission of sounds and vibrations between a supporting member and a supported member, and while rubber is preferable, it will be understood that rubber compositions, leather, felt, and other similar materials may be employed for absorbing the vibrations and sounds.

The invention consists essentially in certain novel combinations and arrangements of parts involving the use of a tapered supporting head enclosed and insulated in a housing, and in the accompanying drawings I have illustrated several exemplifications of the applications of the principles of my invention.

Figure 1 is a perspective view showing a portion of an automotive vehicle-chassis in dotted lines, together with the parts forming the adjustable insulated joint structure.

Figure 2 is an enlarged, vertical sectional view of the adjustable joint structure between an engine or motor and the chassis, it being understood that a complementary structure is utilized at the opposite side of the motor or engine.

Figure 3 is a longitudinal, vertical sectional view of the supporting member of the joint, showing the supporting arm or brace in cross section.

Figure 4:
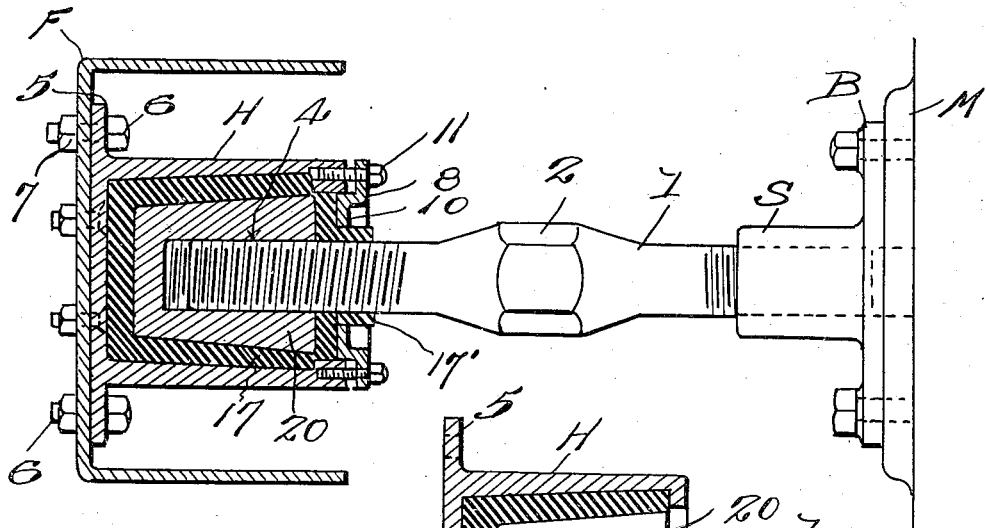
Figure 4 is a view partly in section showing a lateral adjustment of the insulated, tapered head of the supporting structure of the joint, as distinguished from the vertical adjustment of Figures 1, 2 and 3.

In order that the general arrangement and utility of parts may readily be understood I have shown part of a side bar or frame member F of an automotive vehicle, and a portion M of a motor or engine of the vehicle. The joint structure of Figures 1, 2, 4, and 6, may be at the front end or at the rear end of the motor, and while I have shown only one joint structure, as at the left side of the motor, it will be understood that a complementary joint structure is also used at the right side of the motor M.

A bracket B having a threaded sleeve S is bolted to the motor or supported member, and a housing H is attached to the frame member F or supporting member, and a supporting arm, which may be a bolt 1 having its ends oppositely threaded, or an arm B' integral with the bracket B, may be employed to join the supporting member and the supported member.

The bolt 1 is provided with an angular portion 2 adapted to receive a wrench or other tool, and it will be apparent that by turning the bolt on its axis the supporting member and the supported member may be relatively adjusted. By turning the alined bolts that are located at opposite sides of the motor M, the latter may readily be centered, and the motor may be supported with stability between the two side bars or frame members F of the chassis.

The supporting member of the joint includes a head, as 3, or 20 (the latter shown in Figures 4 and 5) in which a hole or opening 4 is provided, and in Figures 1, 2, 3, 4, and 5 this hole is threaded to receive a threaded end of the bolt or tie-arm 1 of the adjustable joint. As indicated in Figures 1 and 3 the head is elongated and it is fashioned with a tapered formation, with at least two inclined or tapered faces of sides, and the ends may be in parallel planes, as indicated in Figures 1 and 3. The lateral faces are illustrated as tapered in Figure 2, while the upper and lower faces are tapered in Figures 4 and 5, and it will be understood that this tapered formation of the head is adapted to the various positions in which the head is employed.

The housing H is preferably fashioned with attaching flanges as 5 and bolts 6 with nuts 7 are employed to attach the housing to the frame F, or the supporting member of the insulated joint.

In Figures 1 and 3, I illustrate the use of two end pressure plates 8 and 9 that are used to adjust the head in longitudinal directions. These end plates are fashioned with interior bosses 10 that project within the end openings of the housing, and bolts 11 passing through the plates and threaded into the end walls of the housing are utilized at opposite ends of the housing and head for adjusting the latter between them.

In Figures 1, 2, and 3 I employ a horizontal pressure-plate 12, located above the head, and between the head and the top of the housing for vertical adjustment of the head within the housing, and two or more vertically arranged bolts as 13 and their nuts 14 are utilized for this adjustment. As indicated in Figures 1 and 3, holes 15 are provided in the top of the housing in order that access may readily be had to the kerfed head of the bolt 13, and a screw driver, or other retaining tool, may be used to hold the bolt. These bolts extend through holes in the pressure plate, and through holes in the tapered head, and the nuts are on the exterior threaded ends of the bolts, beneath the bottom of the housing. Thus, by holding the bolts, the nuts may be turned, or the nuts may be held while the bolts are turned, and the pressure plate is adjusted relatively to the head.

In Figures 1, 2, and 3, I illustrate the use of an insulating pad 16 between the flanged housing H and the face of the frame F to which the housing is attached, and in the several sectional views it will be seen that the head is enclosed in insulating material 17, interposed between the housing and the head, which effectually prevents transmission of vibrations and sounds from the head to the housing, and vice versa. This material which may be resilient rubber, is compressed by the adjusting movements of the head and the pressure plate 12. Thus in several of the forms of the invention, by turning the supporting member or arm 1, the head may be forced toward or from the longitudinal center of the tie-bolt, to bring the head into desired adjusted relation, and the insulating material is compressed, to stabilize the head within its housing, and the elongated formation of the head provides a wide bearing in order that the threaded end of the tie-bolt may turn in the head, and the latter will not be tilted, nor displaced.

The cross bolts 13 may also be used in connection with the pressure plate 12 to adjust the tapered head, vertically, in the insulated, housing, and in addition, the end pressure plates 8 and 9, by use of the bolts 10 may be adjusted so that their bosses will be instrumental in compressing the insulating material 17 at the opposite ends of the head.

At 18 in Figures 2 and 3 I illustrate insulating material in the nature of an anti-rattling pad between the top wall of the housing and the upper face of the pressure plate, and at 19 in Figure 3 I illustrate cushion washers 19 filling the holes of the head through which the adjusting bolts 13 are passed. The insulating material 17 effectually surrounds the head to prevent transmission of vibrations from the tie-bolt and head to the housing and the chassis frame, and where necessary, bosses 17' of insulating material are also provided for this purpose in order to prevent metal-to-metal contact.

In Figure 4, in addition to attaining the adjustment that is accomplished with the threaded tie-bolt in the head, I have shown the use of a pressure plate 8, with its boss 10 and bolts 11. The plate 8, at the inner side of the housing instead of at the end of the housing as in Figure 1, is employed to compress the insulating material against the inner face of the head, that is, the face that is penetrated by the bolt, and the pad 16 of Figure 2 is omitted in this view, while the housing is bolted directly to the frame F.

Figure 5:
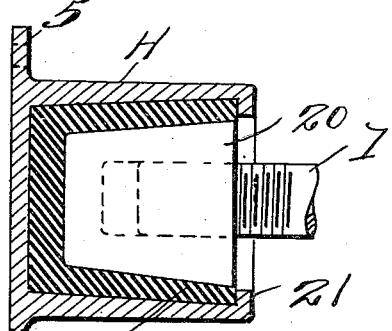
Figure 5 is a sectional view showing a modified arrangement of the parts of Figure 4.

In Figure 5, the housing 20 is employed in manner similar to that shown in Figure 4, but here the pressure plate 8 is omitted, and the necessary adjustment within the housing H is made by turning the tie-bolt thereby causing the tapered head to compress the insulating material in the adjustment of the head within the housing. A retaining flange 21 is provided on the open end of the housing in Figure 5 to retain the insulating material between the head and the housing, thereby insuring a uniform distribution of compression from the head to the insulating material within the housing.

Figure 6:
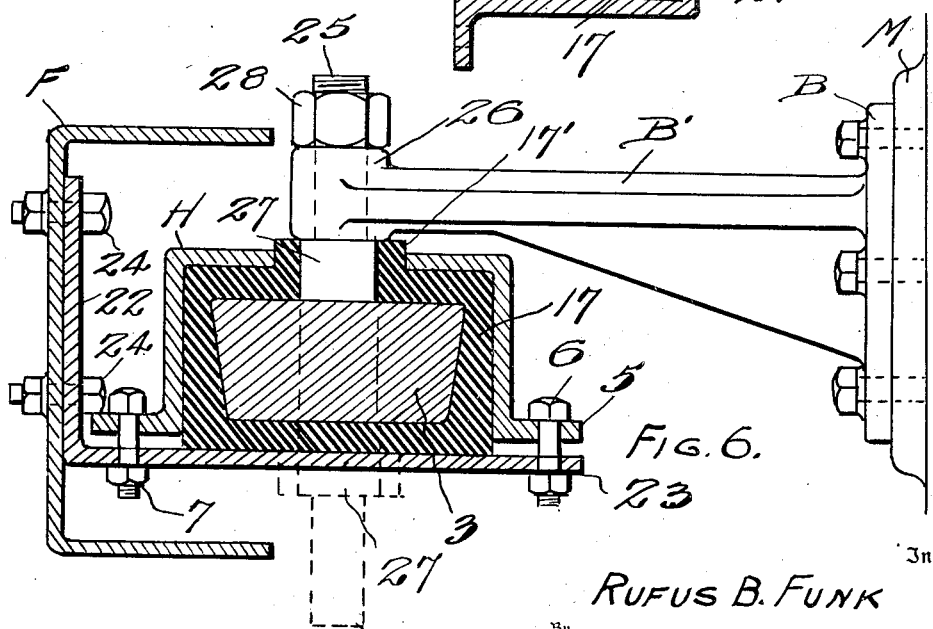
Figure 6 is a further modified form of the supporting member of the insulated joint, with a vertical adjustment, and showing by dotted lines the manner of employing a U-shaped supporting arm.

In Figure 6 a still further modification is shown for the tapered head 3 within the housing H, and in lieu of the tie-bolt as the connection between the supporting member and the supported member, I employ a bracket arm B' integral with, or rigid with the bracket B. In this instance, the supporting part of the joint structure is attached to an L-shaped or angle bracket 22, and the flanges 5 of the housing H, bolts 6, and nuts 7 are employed in attaching the housing on the horizontal flange 23 of this angle bracket. The angle bracket is attached, as by bolts, to the inner side of the channel beam or frame member F of the vehicle, and the bracket arm or connecting member B' joins the head 3 and housing H with the bracket B on motor M.

In this form of the invention I employ a bolt or threaded pin 25 which is slipped upwardly through a collar 26 integral with or rigid with the free end of the bracket arm B' of the connecting member, and the body of the pin or bolt, as 27, forms, at its juncture with the threaded end 25, an annular shoulder on which the collar 26 rests. A nut 28 is threaded on the end 25 of the bolt or pin to clamp the collar down against the shoulder.

This pin or bolt may be an integral part of the head, or, as indicated by dotted lines, the pin 27 may pass through an opening through the head, and in some instances the pin may project through the insulating material and through an opening in the flange 23, as indicated in dotted lines. Thus, when two threaded ends 25 of the bolt project above and below the housing, the bracket arm B' may be U-shaped and provided with two spaced collars 26 and two nuts 28 may be employed for securing the U-shaped arm and the pin or bolt.

In Figure 6, where the pin 27, in full lines, is rigid with the head 3, the adjustment between the housing and the head is accomplished by the use of the bolts 6 and nuts 7 which are employed to draw the housing down over the the insulating material 17 that surrounds the head, and it will be apparent the bolts and nuts clamp the housing rigidly to the flange 23, although the housing is not directly in contact with the flange. As in the other forms of the invention, this clamping action, or adjustment-pressure is equally and uniformly distributed throughout the insulating material. The degree of taper of the faces of the heads illustrated may be varied to suit different conditions, but in all cases the tapered head, or the housing and its parts, and the pressure plates, are utilized to adjust the relation of the head to the housing, and to compress the insulating material in order to provide a stable joining of the parts.

A maximum degree of rigidity is accomplished by applying a maximum force of compression to the insulating material within the housing and enclosing the head, and the force may be applied by turning the tie bolt or connecting member 1 to move the head to the left in Figures 1, 2, 4, and 5 for a lateral compression. It will be understood however that the direction of the application of the compression force depends upon the position of the supporting member with relation to the supported member, and the load of the supported member may be sustained above, below, or at the side of the housing. The lateral compression is readily accomplished through the use of the pressure plates 8 and 9, as in Figures 1, 3, and 4.

The vertical compression of the insulating material within the housing may be accomplished by the use of the pressure plate 12 and the bolts 13 and nuts 14 in Figures 2 and 3, where it will be seen that the insulating material is compressed above the tapered head as well as below the head. The tapered faces of the head also aid in the compression of the material, thereby distributing the compression uniformly throughout the material as it surrounds the head.

In Figure 6, the adjustment secured through tightening of the bolts 6 and nuts 7 draws the housing down over the insulating materials 17, compressing the material above and below the head, and the head, through its tapered side faces also assists in the equal distribution of the compression about the head to insure the desired degree of rigidity in the relation of parts of the joint structure.

Having thus fully described my invention, what I claim as new and desire to secure by Letters Patent is:—

1. In an insulated joint, the combination with a supporting housing having opposed parallel walls and a supported member, of a comparatively large head rigid with the supported member and entirely enclosed within and spaced from the inner faces of the walls of the housing, a relatively thin layer of resilient material inclosing the entire head and interposed between the head and the housing, and means for adjusting the head within the housing toward and from opposed parallel walls of the housing.

2. In an insulated joint, the combination with a supporting housing and a supported member, of a comparatively large head rigid with the supported member and enclosed within and spaced from the housing, a relatively thin layer of resilient material interposed between the head and the housing, an interior pressure plate in contact with the insulating material, adjusting bolts passed through the head and plate and joining these parts with the housing, and nuts on said bolts exterior of the housing.

3. In an insulated joint, the combination with a supporting housing and a supported member, of a comparatively large, tapered head rigid with the supported member and enclosed within and spaced from the housing, a relatively thin layer of resilient material interposed between the head and the housing, a pair of opposed end plates for the housing in contact with the insulating resilient material, and bolts for adjustably attaching the plates to the housing.

RUFUS B. FUNK.